S. HUBER.
Plow-Colter.
No. 226,316.  Patented April 6, 1880.
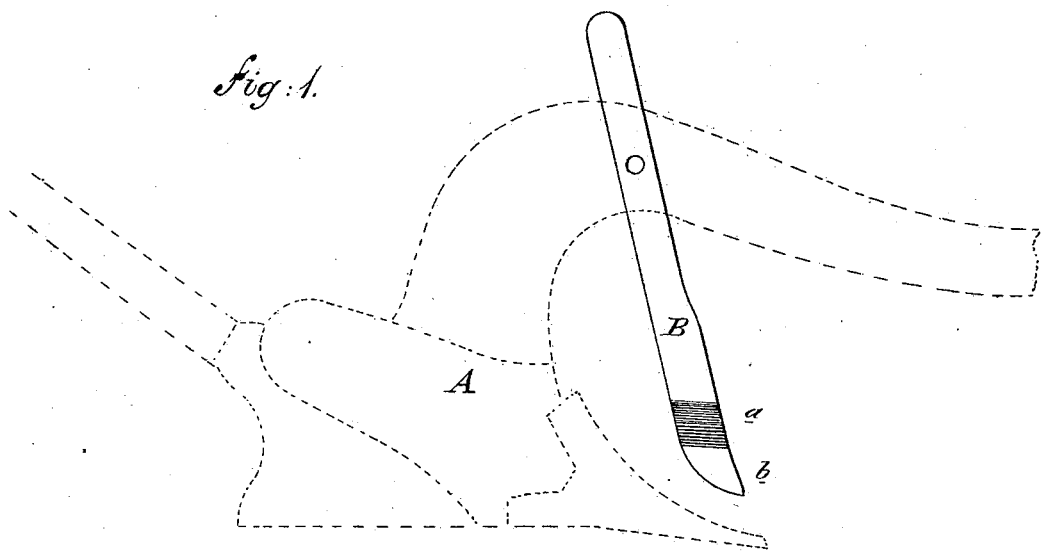
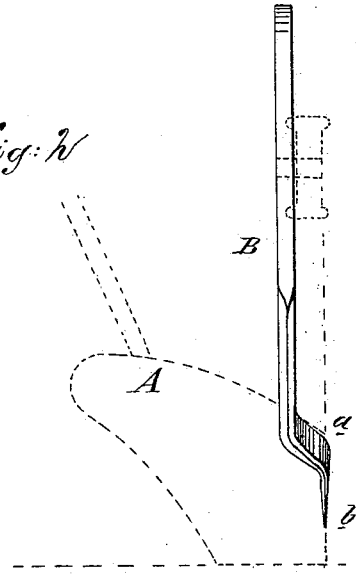
WITNESSES:
INVENTOR:
S. Huber
BY Munn & Co
ATTORNEYS.

UNITED STATES PATENT OFFICE.

SAMUEL HUBER, OF DANVILLE, PENNSYLVANIA.

PLOW-COLTER.

SPECIFICATION forming part of Letters Patent No. 226,316, dated April 6, 1880.

Application filed January 17, 1880.

*To all whom it may concern:*

Be it known that I, SAMUEL HUBER, of Danville, Montour county, Pennsylvania, have invented a new and Improved Plow-Colter, of which the following is a specification.

Figure 1 represents a side elevation of a colter attached to a plow, and Fig. 2 is a vertical front elevation of the same.

Similar letters of reference indicate corresponding parts.

The object of this invention is to construct a plow-colter to be attached to the inner or furrow face of the plow-beam in such a manner that the colter shall cut the grass from the edge of the turf that is to be turned over by the plow, so that the grass shall not protrude upward between the turned furrows.

The invention consists in making an obtuse-angled set-off in the colter toward its land side and near its point, and in giving the front edge of this offset a knife-edge, so that it shall readily cut the grass from the edge of the turf in front of the furrow made by the plow.

In the drawings, A represents the plow; B, the colter, attached to the inner face of the plow-beam and having a sloping offset, *a*, made in it toward its land side near the point, said offset *a* being made to slope forward from the rear to the front edge of the colter and to slope downward to the land side from the shank of the colter toward its point. The front edge of this offset *a*, as well as the front edge of the point *b*, is sharpened into a knife-edge, that it may easily cut down the grass with which it comes in contact, and it will be seen that its sloping edge causes it as it advances to give a drawing angular cut to the grass, after the manner of a scythe-blade.

With this colter placed on the land side of the plow-beam it would not cut the grass from the furrow about to be turned. Hence to effect the object aimed at it is necessarily placed on the furrow side of the beam. This cutter can be applied to plows of all kinds.

I am aware that it is not new to cut the fringe from the inner edge of the furrow; but my improvement adds to this the function of an ordinary colter by having a vertical point, which feature is also useful in imparting steadiness to its operation.

What I claim as new is—

The plow-colter B, sharpened in front, having the fringe-cutter offset *a*, and provided with the sharpened vertical point *b*, as shown and described.

SAMAUEL HUBER.

Witnesses:
R. P. NORTON,
DANIEL LAIDACHER.